Aug. 28, 1951
R. G. STREUBER
2,566,073
RECTIFIER SYSTEM FOR ENERGIZING
ELECTRICAL PRECIPITATORS
Filed Dec. 1, 1948
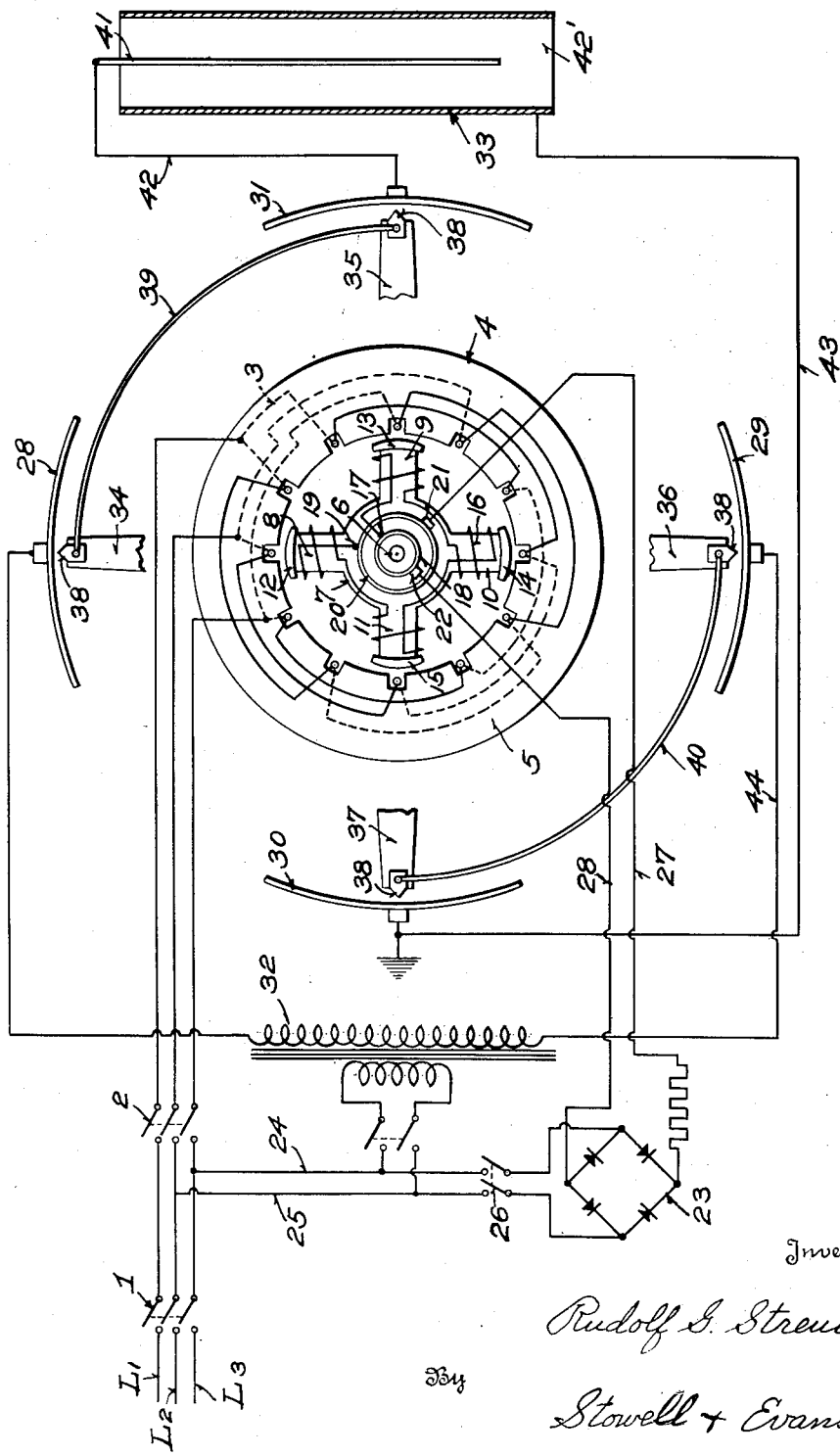
Inventor
Rudolf G. Streuber,
By Stowell + Evans,
ATTORNEYS Patented Aug. 28, 1951

2,566,073

UNITED STATES PATENT OFFICE 2,566,073

RECTIFIER SYSTEM FOR ENERGIZING ELECTRICAL PRECIPITATORS

Rudolf G. Streuber, West Rockport, Maine, assignor to Research Corporation, New York, N. Y., a corporation of New York Application December 1, 1948, Serial No. 62,795

1 Claim. (Cl. 321—50)

This invention relates to a system for energizing electrical precipitators. More particularly it relates to such a system including a rotary current rectifying switch and an electric driving motor therefor so constructed and arranged that when the motor is energized from the same source of alternating current that is rectified by the rotary switch, the rectified current always has a predeterminable constant polarity.

Heretofore, it has been common practice in the art of electrical precipitation to employ a system for energizing precipitators from three-phase, 60 cycle alternating line current of 220-440 volts, including a step-up transformer for raising the line voltage to a value of the order of 50,000 volts and a rotary switch for rectifying the transformer output to supply unidirectional current to the complementary electrodes of the precipitator. The rotary switch typically has been of the four-shoe type, synchronously driven by a four-pole squirrel cage induction motor of the reluctance type energized from the same current source as the transformer. Although the prior art systems do provide direct current of the required voltage for energizing the electrodes of the precipitator, the polarity of the current is a matter of accident and depends upon the position which the rotor of the induction motor takes with respect to the rotating field.

In order to insure that current of constant polarity is supplied to the precipitator electrodes, so that the electrodes will always be positive or will always be negative, such systems are provided with complicated polarity control devices that typically include a magnetic switch for reversing the polarity of the current supplied to the transformer primary winding in response to the position which the squirrel cage rotor of the motor assumes with respect to the stator field. Such polarity control devices typically include a commutating device driven by the motor and a relay system responsive to the direction of current flow through the commutating device, which relay system operates the magnetic reversing switch.

A principal object of the present invention is to provide an electrical precipitator energizing system that provides unidirectional current of constant polarity.

Another object is to provide a simplified system utilizing a step-up transformer and mechanical rectifier that supplies direct current of constant polarity without requiring a complicated polarity control device. Dispensing with the polarity control device eliminates various troublesome components such as the commutating device, the relay system and the magnetic reversing switch referred to hereinbefore. The commutating device has been a source of many operating difficulties; brush wear requires frequent readjustment and failure at this point throws an entire precipitating unit out of service. The relay system and reversing switch also are sources of operating trouble that are eliminated by the present invention.

Another object is to provide a system for energizing electrical precipitators including a rotary switch driving motor that has a rotor element of fixed polarity whereby the rotor invariably pulls into phase and step with the current fed to the switch.

These and other objects of the invention are realized in a system for energizing electrical precipitators including a step-up transformer, circuit elements connecting a source of alternating current to the primary of the transformer, a rotary current rectifying switch, circuit elements connecting the secondary of the transformer to the complementary electrodes of the precipitator through the rotary current rectifying switch, and means for driving the switch in synchronism with the alternations of the current source including a motor comprising a rotor element and a complementary stator element, one of the elements being energized by the current source which energizes the transformer and the other of which is of fixed polarization, whereby to maintain a constant fixed polarity of the direct current supplied by the rotary switch.

The invention will be set forth with greater particularity in the following detailed description of one embodiment thereof taken in connection with the drawing, the single figure of which is a diagrammatic view of a system for energizing an electrical precipitator from three-phase line current in accordance with the principles of the invention.

Referring to the drawing, a conventional power line L₁—L₂—L₃ supplies three-phase alternating current through a master switch 1 and a stator winding control switch 2 to the three-phase, four pole stator winding 3 of an electric motor designated generally by the reference numeral 4. The motor 4 includes a stator core structure 5 that carries the winding 3, which, when energized, sets up a rotating field that is typical of the field induced by the stator of the usual four pole squirrel cage induction motor.

The motor has a central shaft 6 upon which is mounted an armature 7 having four equally spaced, radially extending arms 8, 9, 10 and 11 terminating in pole pieces 12, 13, 14 and 15 that track in a circle closely spaced from the inner periphery of the stator core 5. The armature has a winding 16 that is continuous around the arms 8, 9, 10 and 11 and is wound in such a direction on each arm that opposite pole pieces 12 and 14 will be of like polarity and the alternate pole pieces 13 and 15 will be of opposite polarity when the winding is energized with direct current.

One end 17 of the armature winding 16 is connected to a conductive slip ring 18 insulatedly mounted on the shaft 6. The other end 19 of the armature winding is similarly connected to a second conductive slip ring 20 that is carried by the shaft but insulated therefrom. Brushes 21 and 22 conduct current to the slip rings 18 and 20 respectively, and these brushes are connected to a source of direct current.

Direct current for energizing the armature winding is provided by a selenium rectifier 23 that draws alternating current from two wires $L_2$ and $L_3$ of the line through conductors 24 and 25 and switch 26, and passes full-wave rectified current through conductors 27 and 28 to the slip ring brushes. It will be understood that any other suitable source of direct current may be employed for energizing the armature winding.

The motor 4 drives a rotary rectifying switch having a pair of oppositely disposed, circularly arranged, arcuate input shoes 28 and 29 and a pair of similar output shoes 30 and 31 displaced 90° from the input shoes. The input shoes are connected to the secondary terminals of a step-up transformer 32, the primary winding of which is energized by alternating current from the wires $L_2$ and $L_3$ of the line. The output shoes are connected, for example, to the complementary electrodes of an electrical precipitator diagrammatically shown at 33.

Cooperating with the stator shoes of the rectifying switch is a rotor having four radial insulating arms 34, 35, 36 and 37 carried by the shaft 6 and disposed 90° apart. Each arm has a pointed conductive tip 38, the tips being positioned to swing in a circle closely spaced from the stator shoes. An arcuate jumper wire 39 interconnects the tips of arms 34 and 35 and a similar jumper wire 40 interconnects the tips of arms 36 and 37.

In operation, the field winding of the motor is energized by closing switches 1 and 2. Assuming that the line $L_1$—$L_2$—$L_3$ carries 60 cycle alternating current of 220–440 volts, the construction and winding of the stator of motor 4 is such that the field setup thereby has four poles equally spaced about the stator, the poles being of alternate opposite polarity. The sign of the poles is reversed with the alternations of the current to provide in effect a quadripolar field that rotates at 1,800 R. P. M.

The armature winding is energized by closing switch 26, thus inducing fixed polarity in the pole pieces of the armature. For example, pole pieces 12 and 14 may be south poles and pole pieces 13 and 15 may be north poles. The interaction of the field of fixed polarity generated by the armature and the rotating field of corresponding polarity generated by the stator causes the armature to rotate in phase and in step with the stator field, at 1,800 R. P. M. under these exemplary conditions.

The rectifying switch rotor is thus driven at 1,800 R. P. M. The rotor is so positioned on the shaft 6 that the arms are opposite the centers of the shoes when current flow in the secondary winding of transformer 32 is at its peak value.

With the parts in the positions shown in the figure, the operating switches being closed, and assuming that the upper terminal of transformer 32 is negative, it will be seen that a circuit is completed from the upper terminal to the discharge electrode 41 of the electrical precipitator 33 through the input shoe 28 of the rotary switch, across an air gap to the tip of rotor arm 34, through the jumper wire 39 to the tip of arm 35, across an air gap to the output shoe 31 and through the cable 42. The return circuit from the extended surface electrode 42' of the precipitator to the lower or positive terminal of transformer 32 is completed through the cable 43, the shoe 30, across an air gap to the tip of arm 37, through the jumper wire 40 to the tip of arm 36, across an air gap to the shoe 29 and through the cable 44. Thus, the discharge electrode 41 of the precipitator is negatively charged with respect to the complementary extended surface electrode 42'.

When the transformer 32 reverses polarity on the next alternation of current, the rectifying switch rotor advances 90°. In this position the jumper wires 39 and 40 interconnect input shoe 28 with output shoe 30 and input shoe 29 with output shoe 31. It will be apparent that the discharge electrode 41 is connected to the lower terminal of the transformer which is now negative and that the extended surface electrode 42 is connected to the upper terminal of the transformer 32 which is now positive. Thus, unidirectional current of constant polarity is applied to the electrodes of the precipitator.

The polarity of the current applied to the precipitator electrodes may be reversed, if desired, by reversing the connections to the primary or secondary winding of the transformer 32, by reversing the connections to the precipitator electrodes, by reversing the direction of current flow in the armature winding 16, or by offsetting by 90° the position of the switch rotor on the motor shaft 6.

From the foregoing description it will be seen that the rectifying device of the present invention delivers current of constant polarity and that no expensive and unreliable polarity control device is required to insure that current of preselected polarity is applied to the load.

It will also be understood that the invention is not limited to the form shown by way of illustration and described with reference to particular current values. It will be understood that the rotary rectifying switch is operated to reverse polarity at the output terminals thereof in synchronism with the alternations of the current being fed to the switch. In the particular switch shown, the rotor thereof is turned at one-half the cyclic rate of the alternating current.

Although the invention has been particularly described herein with reference to apparatus for energizing electrical precipitators from a three phase power supply, it will be understood that the principles of the invention can be applied to utilize a two phase power supply or any polyphase power supply. Even a single phase supply may be utilized if a starting winding is provided for the motor.

It will also be apparent that the apparatus can be used for half wave energization by providing a synchronous distributing switch that delivers one-half of the rectified wave to one precipitator and the other half to another precipitator.

I claim:

A motor rectifier system for energizing electrical precipitators and the like comprising a rotary mechanical rectifying switch including a stator element having input and output terminals arranged in a circular path with the centers of the input terminals disposed substantially 90° from the centers of the output terminals and a complementary rotor element having conductor means centered in opposite quadrants and positioned to interconnect successive stator terminals spaced 90° apart as said rotor is rotated relative to said stator; a synchronous electric motor including a stator member and a complementary rotor member, one of said members having a four-pole, three phase winding and the other of said members having four magnetic pole pieces having direct current windings; a rotary shaft carrying said rotor element and said rotor member in common; a current rectifying device including a dry type static electric valve having input terminals and output terminals, the output terminals of said rectifying device being connected to the direct current windings of said motor member having four magnetic pole pieces; a step-up transformer having a primary winding and a secondary winding; conductor means directly connecting the secondary winding of said transformer to the input terminals of said rectifying switch; a three-conductor master switch having input terminals connectible to a source of three phase alternating current and output terminals; and conductor means connecting the output terminals of said switch to the input terminals of said current rectifying device, the four-pole, three phase winding of said one motor member, and the primary winding of said transformer.

RUDOLF G. STREUBER.

REFERENCES CITED

The following references are of record in the file of this patent:

UNITED STATES PATENTS

| Number | Name | Date |
| --- | --- | --- |
| 1,048,819 | Fayer | Dec. 31, 1912 |
| 1,553,363 | Chubb | Sept. 15, 1925 |
| 1,583,622 | Steinmetz | May 4, 1926 |
| 1,620,732 | Mutscheller | Mar. 15, 1927 |
| 1,675,057 | Schmidt | June 26, 1928 |
| 2,016,531 | Wintermute | Oct. 8, 1935 |
| 2,116,899 | Kalsey | May 10, 1938 |
| 2,188,695 | Wintermute | Jan. 30, 1940 |
| 2,247,361 | Corbitt | July 1, 1941 |
| 2,268,375 | Corbitt | Dec. 30, 1941 |
| 2,397,116 | Armstrong | Mar. 26, 1946 |
| 2,450,530 | Sussin | Oct. 5, 1948 |